United States Patent
Knoth et al.

(10) Patent No.: US 9,776,878 B2
(45) Date of Patent: Oct. 3, 2017

(54) PROCESS FOR CONVERTING SILICON TETRACHLORIDE TO TRICHLOROSILANE

(71) Applicant: Wacker Chemie AG, Munich (DE)

(72) Inventors: Jens Felix Knoth, Munich (DE); Hans-Juergen Eberle, Munich (DE); Christoph Ruedinger, Starnberg (DE)

(73) Assignee: Wacker Chemie AG, Munich (DE)

(*) Notice: Subject to any disclaimer, the term of this patent is extended or adjusted under 35 U.S.C. 154(b) by 348 days.

(21) Appl. No.: 14/096,612

(22) Filed: Dec. 4, 2013

(65) Prior Publication Data

US 2014/0170050 A1    Jun. 19, 2014

(30) Foreign Application Priority Data

Dec. 19, 2012 (DE) .................. 10 2012 223 784

(51) Int. Cl.
*C01B 33/107* (2006.01)

(52) U.S. Cl.
CPC .................. *C01B 33/1071* (2013.01)

(58) Field of Classification Search
CPC .................................. C01B 33/1071
USPC .................................. 423/341–342
See application file for complete search history.

(56) References Cited

U.S. PATENT DOCUMENTS

| | | | |
|---|---|---|---|
| 3,564,328 A * | 2/1971 | Bagley | C04B 35/115 156/86 |
| 3,933,985 A | 1/1976 | Rodgers | |
| 4,217,334 A | 8/1980 | Weigert | |
| 4,293,325 A * | 10/1981 | Chirino | C03C 8/24 106/286.5 |
| 4,526,769 A * | 7/1985 | Ingle | C01B 33/035 423/342 |
| 4,536,642 A | 8/1985 | Hamster | |
| 5,906,799 A * | 5/1999 | Burgie | B01J 19/02 422/241 |
| 8,168,152 B2 | 5/2012 | Saiki | |
| 8,197,784 B2 | 6/2012 | Pfluegler | |
| 2004/0173597 A1 | 9/2004 | Agrawal et al. | |
| 2008/0112875 A1 | 5/2008 | Ruedinger | |
| 2009/0155138 A1 | 6/2009 | Ishii et al. | |
| 2009/0285743 A1 * | 11/2009 | Mizushima | C01B 33/1071 423/342 |
| 2009/0324477 A1 * | 12/2009 | Mizushima | C01B 33/1071 423/342 |
| 2010/0178230 A1 | 7/2010 | Saika | |
| 2011/0200512 A1 | 8/2011 | Saiki et al. | |
| 2013/0224098 A1 | 8/2013 | Latoschinski et al. | |

FOREIGN PATENT DOCUMENTS

| | | | |
|---|---|---|---|
| DE | 3024319 C2 | 1/1982 | |
| DE | 3024320 C2 | 4/1982 | |
| DE | CA 2786420 A1 * | 7/2011 | B01J 8/062 |
| DE | 102010039267 A1 | 2/2012 | |
| EP | 2085359 A1 | 8/2009 | |
| EP | 2088124 A1 | 8/2009 | |
| JP | 60-81010 A | 5/1985 | |
| JP | 2008133175 A | 6/2008 | |
| JP | 2011136904 A | 7/2011 | |
| WO | 2008146741 A1 | 12/2008 | |

OTHER PUBLICATIONS

Reutler et al, "The modular high-temperature reactor", abstract only, 1983, taken from http://inis.iaea.org/search/searchsinglerecord.aspx?recordsFor=SingleRecord&RN=15036477.*
PatBase machine translation for DE 3024319.
Abstract for JP 60-81010.

* cited by examiner

Primary Examiner — Ngoc-Yen Nguyen
(74) Attorney, Agent, or Firm — Caesar Rivise, PC

(57) ABSTRACT

The invention relates to a process for converting silicon tetrachloride (STC) to trichlorosilane (TCS), by introducing reactant gas containing STC and hydrogen into a reaction zone of a reactor in which the temperature is 1000-1600° C., wherein the reaction zone is heated by a heater located outside the reaction zone and the product gas containing TCS which forms is then cooled, with the proviso that it is cooled to a temperature of 700-900° C. within 0.1-35 ms, wherein the reactant gas is heated by the product gas by means of a heat exchanger working in countercurrent, wherein reactor and heat exchanger form a single, gas-tight component, wherein the component includes one or more ceramic materials selected from the group consisting of silicon carbide, silicon nitride, graphite, SiC-coated graphite and quartz glass.

18 Claims, 1 Drawing Sheet

PROCESS FOR CONVERTING SILICON TETRACHLORIDE TO TRICHLOROSILANE

BACKGROUND OF THE INVENTION

Figure 1:
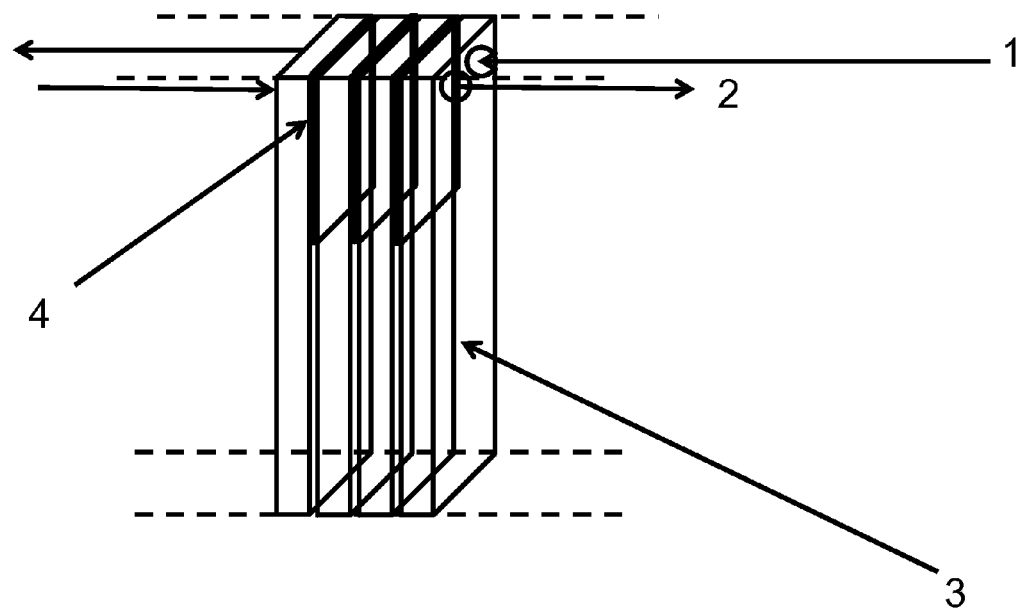

The invention provides a process for converting silicon tetrachloride to trichlorosilane.

Trichlorosilane (TCS) is used for the preparation of polycrystalline silicon.

TCS is typically prepared in a fluidized bed process from metallurgical silicon and hydrogen chloride. In order to obtain high-purity TCS, this is followed by a distillation. In this preparation, silicon tetrachloride (STC) is also obtained as a by-product.

The greatest amount of STC is obtained in the deposition of polycrystalline silicon.

Polycrystalline silicon is produced, for example, by means of the Siemens process. This involves depositing polycrystalline silicon in a reactor on heated thin rods. The process gas used as the silicon-containing component is a halosilane such as TCS, in the presence of hydrogen. The conversion of TCS (disproportionation) to deposited silicon forms large amounts of STC.

It is possible to produce fumed silica from STC, for example by reaction with hydrogen and oxygen at high temperatures in combustion chambers.

However, the use of STC that is of greatest economic interest is the conversion to TCS. This is effected by reaction of STC with hydrogen to give TCS and hydrogen chloride. This makes it possible to produce TCS again from the STC by-product formed in the deposition, and to feed that TCS back to the deposition operation in order to produce elemental silicon.

Two processes for conversion are known: the first process, called low-temperature conversion, is performed in the presence of one or more catalysts. However, the presence of catalysts (e.g. Cu) can adversely affect the purity of the TCS and hence of the silicon deposited therefrom. A second process, called high-temperature conversion, is an endothermic operation, wherein the formation of the products is equilibrium-limited. In order to arrive at any significant TCS production at all, very high temperatures have to be employed in the reactor ($\geq 900°$ C.)

U.S. Pat. No. 3,933,985 A describes the reaction of STC with hydrogen to give TCS at temperatures in the range from 900° C. to 1200° C. and with a molar $H_2:SiCl_4$ ratio of 1:1 to 3:1. However, only yields of 12-13% are achieved.

For energy-saving reasons, the reactants of the reaction (STC and hydrogen) are often heated, typically with the aid of the hot offgases from the reactor (products and residues of the reactants, i.e. essentially TCS, hydrogen chloride, STC and hydrogen).

DE 30 24 320 C2 claims, for example, an apparatus for conversion of STC to TCS using a heat exchanger unit. The heat exchanger unit may consist, for example, of a set of electrically unheated graphite tubes which serve as a gas outlet for product gas, and reactant gas flows around the outside of these in countercurrent.

U.S. Pat. No. 4,217,334 A discloses a process for hydrogenation of STC with hydrogen to TCS within a temperature range of 900-1200° C. By virtue of a high molar $H_2$:STC ratio (up to 50:1) and a liquid quench of the hot product gas below 300° C., distinctly higher TCS yields are achieved (up to about 35% at a molar $H_2$:STC ratio=5:1). Disadvantages, however, are the distinctly higher hydrogen content in the reaction gas and the employment of a quench by means of a liquid, both of which greatly increase the energy expenditure in the process and hence the costs, especially since the cooling is effected without utilization of the energy released.

WO 2008/146741 A1 discusses the preparation of TCS by reduction of STC. The operation is divided into two reaction stages. The first stage is conducted within a first temperature range of 1000-1900° C. The first reaction stage is followed by cooling of the reaction gas to 950° C. or less within 1 s. In a second reaction step the temperature is kept at 600-950° C. for 0.01-5 s before cooling is effected to temperatures of less than 600° C.

U.S. Pat. No. 8,168,152 B2 likewise discloses a multi-stage cooling operation in the hydrogenation of STC to TCS. The reaction temperature is 1000-1900° C. Cooling is effected to a temperature of greater than or equal to 600° C. within 10 ms from the commencement of cooling, and to a temperature of less than or equal to 500° C. within 2 s. U.S. Pat. No. 8,168,152 B2 describes the necessity of a hold step in the cooling process, such that the temperature has to be kept at a temperature in the range of 500-950° C. over a period of 10-5000 ms, in order to decompose higher-order silanes which form and hence to prevent the formation of polymers.

EP 2 088 124 A1 discloses that high conversion rates are achieved by rapid cooling of a reaction gas mixture which is obtained by reaction of STC and $H_2$ at temperatures of 900-1900° C. However, the high cooling rate is achieved by quenching to 800-300° C. Only at these relatively low temperatures is the energy released in the course of cooling transferred to the reactants.

EP 2 085 359 A1 describes a process in which STC and hydrogen are reacted at temperatures above 800° C. The product gas is cooled (quenched) to T less than or equal to 650° C. by means of a cooling gas within 1 s. High yields are obtained by quenching the reaction gas either by means of liquids or by means of gases. However, the energy removed in this context cannot be utilized in an economically viable manner.

DE 3024319 A1 likewise relates to a continuous process for preparing TCS by hydrogenation of STC in a high-temperature reactor at 900-1300° C. In this context, the reaction time in the reactor, however, is 200-2 s.

U.S. Pat. No. 8,197,784 B2 claims a process for preparing TCS, which is effected by reaction of STC- and $H_2$-containing gases at supercritical pressure. In this case, the reactant gases reside in the reaction zone for 200-0.05 s and are cooled thereafter to 300° C. within 200-0.05 s.

US 2008/0112875 A1 discloses a process for preparing TCS by hydrogenation of STC at reaction temperatures of 700-1500° C., in which the product mixture is cooled to the cooling temperature ($T_{Cool}$) by means of a heat exchanger within a residence time of the reaction gases of $$\tau = A \times \exp(-B \times T_{Cool}/1000)[ms] \text{(where } A=4000;$$
$$6 \leq B \leq 50 \text{ and } 100° \text{ C.} \leq T_{Cool} \leq 900° \text{ C.)}$$

the energy removed by means of a heat exchanger being used to heat the reactant gases. The residence times of the reaction gas in the reactor are $\tau \leq 0.5$ s.

However, it has been found that, in the process according to US 2008/0112875 A1, there can be surprising operational losses in yield and hence in economic viability.

It was an object of the invention to avoid this.

DESCRIPTION OF THE INVENTION

The object of the invention is achieved by a process for converting STC to TCS, by introducing reactant gas comprising STC and hydrogen into a reaction zone of a reactor in which the temperature is 1000-1600° C., wherein the reaction zone is heated by a heater located outside the reaction zone and the product gas comprising TCS which forms is then cooled, with the proviso that it is cooled to a temperature of 700-900° C. within 0.1-35 ms, wherein the reactant gas is heated by the product gas by means of a heat exchanger working in countercurrent, wherein reactor and heat exchanger form a single, gas-tight component, wherein the component consists of one or more ceramic materials selected from the group consisting of silicon carbide, silicon nitride, graphite, SiC-coated graphite and quartz glass.

The process envisages conducting reactant gases into a reaction zone in which they reside only very briefly at high temperatures of 1000-1600° C. Downstream of this reaction zone, the temperature of the gases is lowered extremely rapidly by heat exchange, with transfer of the energy released by cooling to the reactant gas, and such a high rate of cooling that the thermal equilibrium is frozen.

In this context, the reaction of the gases and the heat exchange are effected in a single one-piece apparatus consisting of one or more ceramic materials selected from the group consisting of silicon carbide, silicon nitride, graphite, SiC-coated graphite and quartz glass. The apparatus is gas-tight. In the prior art, reactor and heat exchanger were two components, and so it was necessary to use seals between the two components. The inventors have recognized that the losses observed in the economic viability are attributable to leaks. These leaks were caused by faulty seals, which appear to be particularly sensitive in the high-temperature range.

The invention gets around this problem by virtue of the fact that no seals whatsoever are required any longer between heat exchanger and reactor, since the component is a single gas-tight component comprising reactor with reaction zone and heat exchanger. Reactor and heat exchanger may be assembled from a plurality of parts by sintering. However, they form a single component in that the individual parts are not secured to one another by assembly aids such as screws, bolts or clamps, which would necessitate seals.

The apparatus comprises channels or capillaries, with flow only of product gas in one portion of the capillaries or channels and only of reactant gas in the other portion. The capillaries may also be arranged in the form of a shell and tube heat exchanger. In this case, a gas stream flows through the tubes (capillaries), while the other gas stream flows around the tubes.

The process can also achieve high cooling rates. This is preferably accomplished by varying a channel depth of the apparatus with the reactor length. In this case, in regions which require particularly high energy transfer, channels having low hydraulic diameters (e.g. <0.5 mm) are used, whereas the hydraulic diameters of the channels may be greater in the other regions. This achieves rapid cooling with reduced backpressure of the reactor.

The reaction zone in the reactor is heated from the outside. For this purpose, a heater is provided outside the reaction zone. Thus, the heating elements are not exposed to the reaction medium. This is particularly advantageous because the lifetime thereof is increased as a result. This makes the process more economically viable. While all executions of heating familiar to those skilled in the art can be used, electrical heating, with heat transfer by means of radiation, is particularly preferred.

The reaction zone in the apparatus (reactor+heat exchanger) is understood to mean the region which is heated from the outside and which is not conducted in cocurrent, cross-current or countercurrent to the reactant gas.

The reaction temperature is 1000-1600° C.

The measurement of the reaction temperature is determined as the maximum surface temperature of the component, preferably by means of a pyrometric measurement.

For example, a pyrometer of the IGA 140-TV type from Lumasense Technologies is suitable for this purpose.

By virtue of the high surface to volume ratio of the apparatus at the hottest point of preferably surface/volume >500 m$^{-1}$, the surface temperature corresponds to the gas temperature at this position, which would not be amenable to a direct measurement in such a simple manner.

The gas has only a short hydrodynamic residence time in the reaction zone of preferably $0.1 \text{ ms} \leq \tau \leq 250$ ms, more preferably $0.2 \leq \tau \leq 100$ ms, even more preferably $0.5 \leq \tau \leq 20$ ms, most preferably $1 \leq \tau \leq 10$ ms.

The hydrodynamic residence time is calculated here by the formula familiar to the person skilled in the art:

$$\tau = \frac{V_R}{\dot{V}}$$

where $V_R$: reactor volume, or volume of the reaction zone, and $\dot{V}$: volume flow rate of gas under the reaction conditions (p,T).

Downstream of the reaction zone, the gas is cooled rapidly to a temperature of 700-900° C. within 0.1-35 ms.

Preferably, the selected cooling times to temperatures of 700-900° C. are found from the formula $$\tau = A \times \exp(-B \times T_{Cool}/1000) \text{ [ms]} \text{ (where } A=4000; 700° \text{C.} \leq T_{Cool} \leq 900° \text{C.)}$$

where the following applies to B according to the cooling temperature:

$T_{Cool}=700°$ C.: $15.1 \geq B \geq 6.75$, preferably $T_{Cool}=700$: $11.8 \geq B \geq 7.72$; more preferably $T_{Cool}=700$: $10.86 \geq B \geq 8.56$;
$T_{Cool}=800°$ C.: $13.25 \geq B \geq 5.92$, preferably $T_{Cool}=800$: $10.37 \geq B \geq 6.75$; more preferably $T_{Cool}=800$: $9.5 \geq B \geq 7.49$;
$T_{Cool}=900°$ C.: $11.8 \geq B \geq 5.25$, preferably $T_{Cool}=900$: $9.21 \geq B \geq 6$; more preferably $T_{Cool}=900$: $8.45 \geq B \geq 6.66$.

In the case of cooling temperatures between the specified values of 700° C., 800° C., 900° C., the values of B should preferably be interpolated.

According to the pressure at the reactor outlet, the cooling to a temperature of 700° C. is preferably effected within 0.1-10 ms in the case of a gauge pressure of 0.1 bar at the reactor outlet, within 0.1-20 ms in the case of a gauge pressure of 5 bar at the reactor outlet, and within 0.1-35 ms in the case of a gauge pressure of 10 bar at the reactor outlet.

The maximum cooling times to a temperature of 700° C. should be 10-20 ms for pressures at the reactor outlet between 0.1 bar and 5 bar, and should rise in a linear manner within this pressure range.

The maximum cooling times to a temperature of 700° C. should be 20-35 ms for pressures at the reactor outlet between 5 bar and 10 bar, and should rise in a linear manner within this pressure range.

The cooling is effected without hold steps. Cooling can be effected directly, continuously and rapidly.

Preference is given to cooling to a temperature of 700° C. within 1-7 ms in the case of a gauge pressure at the reactor outlet of 0.1 bar. Particular preference is given to a cooling time of 1.5-5 ms in the case of a gauge pressure at the reactor outlet of 0.1 bar, and very particular preference is given to a cooling time of 2-4 ms in the case of a gauge pressure at the reactor outlet of 0.1 bar.

Preference is given to cooling to a temperature of 700° C. within 1-18 ms in the case of a gauge pressure at the reactor outlet of 5 bar. Particular preference is given to a cooling time of 1.5-10 ms in the case of a gauge pressure at the reactor outlet of 5 bar, and very particular preference is given to a cooling time of 2-6 ms in the case of a gauge pressure at the reactor outlet of 5 bar.

Preference is given to cooling to a temperature of 700° C. within 1-33 ms in the case of a gauge pressure at the reactor outlet of 10 bar. Particular preference is given to a cooling time of 1.5-20 ms in the case of a gauge pressure at the reactor outlet of 10 bar, and very particular preference is given to a cooling time of 2-10 ms in the case of a gauge pressure at the reactor outlet of 10 bar.

The energy removed in the course of cooling is utilized for heating of the reactant input stream.

After cooling has been effected to a temperature of 700° C., the further subsequent cooling can be effected much more slowly. This is preferable. This is because it has been found that continuing rapid cooling cannot achieve any further increase in yield.

The high cooling rate is enabled by means of the particular configuration of the apparatus:

The efficiency of the heat exchanger is preferably varied with the reactor length, and this is ideally done by means of a variation in the characteristic length of the hydrodynamics, namely in the hydraulic diameter, with the reactor length.

As a result of this, a lower pressure drop is preferably generated by cross-sectional widening in the range of lower temperatures of less than 700° C., preferably with implementation of high heat exchange efficiency within the range of higher temperatures of greater than or equal to 700° C.

Thus, in a preferred embodiment of the process, the typical structure size (or characteristic length) is varied with the reactor length. In a preferred embodiment, the channel depth and the number of channels in the apparatus are varied with the reactor length.

The channels may have any desired cross section, especially a circle, a rectangle, a rhombus, a triangle, a U shape, a W shape etc.

In a further preferred embodiment of the process, land structures or similar structures are provided, these being known to the person skilled in the art in the field of heat transfer and showing an equivalent effect. In this embodiment, the distance between the lands and a free flow cross section are preferably varied with the reactor length.

In a particularly preferred embodiment of the invention, channels with a rectangular cross section are used.

Preferably, in regions which require particularly high energy transfer, channels with low hydraulic diameters are used, whereas the hydraulic diameters of the channels may be greater in the other regions. The hydraulic diameter is calculated here by the formula known to those skilled in the art:

$$d_h = 4\frac{f}{U}$$

where f: cross-sectional area of the channel and U: circumference of the channel The hydraulic diameter in the channels in regions with particularly high energy transfer is preferably 0.05 mm$\leq d_h <$1 mm, more preferably 0.25 mm$\leq d_h \leq$0.75 mm and most preferably 0.4 mm$\leq d_h \leq$0.6 mm.

The further cooling of the reaction gas also proceeds with exploitation of the energy released, and without presence of a hold step in the temperature profile.

The total residence time in the apparatus (reaction zone plus heat exchange) is preferably 10 ms$\leq\tau\leq$400 ms, more preferably 20$\leq\tau\leq$200 ms, especially preferably 40$\leq\tau\leq$110 ms.

Low residence times are advantageous especially from the point of view of proven safety.

The overall apparatus can be constructed in a very space-saving and compact manner, and has a total length of the ceramic structure of $\leq$1500 mm, preferably $\leq$1000 mm, more preferably $\leq$600 mm.

In the seal-free part, the apparatus combines both a reaction region and a section in which heat exchange takes place between reactant gas and product gas. The two regions are combined in one component in a seal-free and externally gas-tight manner.

Moreover, apart from the reaction space, the gas conduits for the reactant gas and the product gas are separated from one another in a gas-tight manner, as a result of which leaks from the reactant gas to the product gas that would reduce the yield are reliably prevented.

In addition, in the high-temperature range of greater than 500° C., there is no need to use seals, as a result of which higher service lives of the reactor can be achieved and, in addition, operational safety is increased.

The single components (or units) can be combined with one another, such that the production capacity can preferably be adjusted through the parallel connection of the units.

FIG. 1 shows, in schematic form, how such a parallel connection of reactor units can be configured.

1 shows the passage for reactant gas.

2 shows the passage for product gas.

3 shows one of the connected reactor units (single, gas-tight component).

4 shows a seal between the reactor units.

Figure 2:
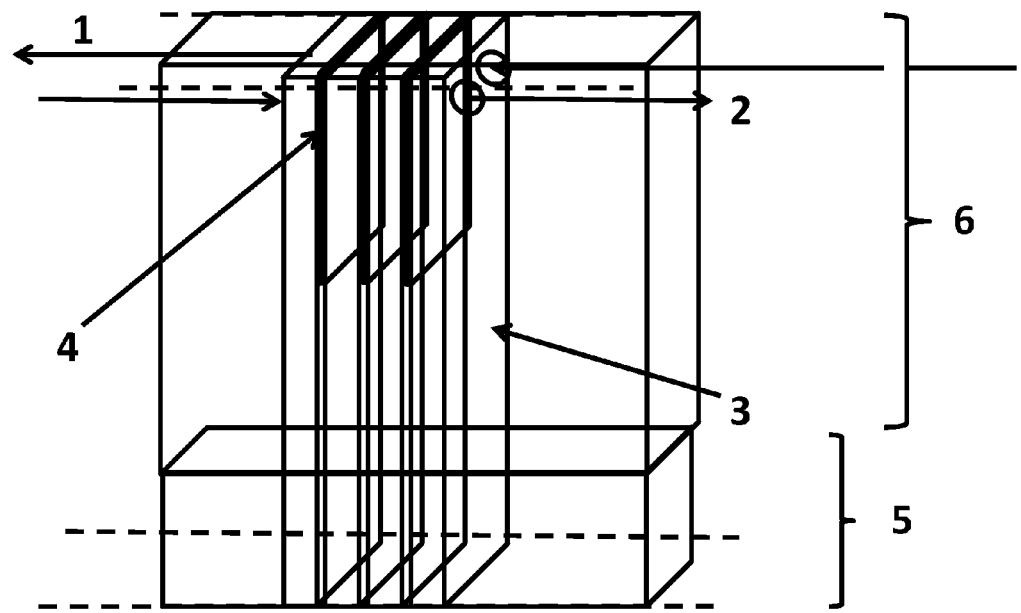

FIG. 2 shows, in schematic form, how a parallel connection is heated.

FIG. 2 describes a preferable execution of the combination of the inventive components.

1 shows the passage for the reactant gas; 2 shows the passage for the product gas.

3 shows one of the connected reactor units (single, gas-tight component).

These units can be combined, for example, by means of seals 4.

In this case, the seals are preferably used in the cold region, namely in the unheated region. The temperature in the unheated region may, for example, be less than or equal to 500° C.

The heating 5, in a preferred embodiment, is limited to the reaction region and heats it to 1000-1600° C. The heating may be from the bottom or from the top (from the bottom in FIG. 2).

It is possible here to employ all methods of heating familiar to those skilled in the art, preferably but not restricted to electrical heating and heat transfer by means of radiation.

Preference is given to heating only the reaction zone, while the rest of the component is thermally insulated, see region 6.

The combination of the individual reactor units 3 should preferably be configured such that the components are connected in a gas-tight manner to one another; this can be effected by a method familiar to those skilled in the art (for example by means of seals with appropriate tensioning of the components).

The above-elucidated embodiments of the apparatus also allow the operation thereof under elevated pressure.

For instance, the reactor can be operated at a gauge pressure of the product gas at the reactor outlet of 0-10 bar, preferably of 2-6 bar and more preferably at 3-5 bar. This has the advantage that the mass throughput and hence the economic viability are increased further.

The pressure which results at the reactor inlet accordingly depends on the throughput.

In addition, as well as hydrogen and STC, further components may also be present in the reactant gas, especially HCl, hydrocarbons, hydrochlorosilanes, oligochlorosilanes, hydrogenated oligochlorosilanes, organochlorosilanes, and also siloxanes and organosiloxanes.

EXAMPLES

The experiments were conducted in an apparatus which consisted completely of SiC.

A mixture of 676 mL/h and 264 l (STP)/h(l(STP): standard liters) of hydrogen was fed in.

The minimum hydrodynamic diameter was 0.4 mm.

The reactor was electrically heated in an oven; the heat input at the high temperatures took place predominantly via radiation.

The measurement of the reaction temperature was determined as the maximum surface temperature of the apparatus by means of pyrometric measurement.

The data determined by pyrometry corresponded to the measurement from a type B thermocouple mounted directly adjacent to the reaction zone.

The hydrodynamic residence times are calculated from the ratio of reactor volume to volume flow rate under the conditions determined (p,T).

The residence time in the reaction zone was between 2.8 (1000° C.) and 1.6 (1500° C.) ms.

Table 1 shows the results of five experiments.

In each case, the mass flow rates of H2 and STC, and also temperatures, residence times (RT), pressures and conversion rates (C rate), are reported.

Measurements were effected at 1000° C., 1100° C., 1200° C., 1400° C. and 1500° C.

gas is cooled to a temperature of 700-900° C. within 0.1-35 ms, (b) the reactant gas is heated by the product gas by use of a heat exchanger working in countercurrent, (c) the reactor and the heat exchanger form a single, gas-tight component, (d) the component comprises at least one ceramic material selected from the group consisting of silicon carbide, silicon nitride, graphite, SiC-coated graphite and quartz glass, and (e) a hydrodynamic residence time of reactant gas in the reaction zone is 1 to 10 ms.

2. The process as claimed in claim 1, wherein a total residence time in the reactor and the heat exchanger is 10-400 ms.

3. The process as claimed in claim 1, wherein cooling of the product gas is effected without hold steps.

4. The process as claimed in claim 1, wherein the product gas, according to a pressure at a reactor outlet, is cooled in each case to 700° C. within 0.1-10 ms in the case of a gauge pressure of 0.1 bar at the reactor outlet, within 0.1-20 ms in the case of a gauge pressure of 5 bar at the reactor outlet, and within 0.1-35 ms in the case of a gauge pressure of 10 bar at the reactor outlet.

5. The process as claimed in claim 1, in which the single component formed from the reactor and the heat exchanger comprises channels, wherein only product gas or only reactant gas flows through some of the channels, wherein channel depth and a number of channels vary with a length of the single component, wherein channels are present in which a hydraulic diameter of the channels is 0.05-1mm.

6. The process as claimed in claim 1, wherein a length of the single component is not more than 1500 mm.

7. The process as claimed in claim 1, wherein the heat exchanger has a ratio of exchange area to gas volume of >500 m$^{-1}$.

8. The process as claimed in claim 1, wherein the reactor is operated at a gauge pressure of the product gas at a reactor outlet of 0-10 bar.

9. The process as claimed in claim 1, wherein a plurality of single gas-tight components each formed by the reactor and the heat exchanger are connected to one another, with provision of common passages for reactant and product gas.

10. The process as claimed in claim 2, wherein cooling of the product gas is effected without hold steps.

11. The process as claimed in claim 10, wherein the product gas, according to a pressure at a reactor outlet, is

TABLE 1

| | Mass flow rates | | Temperatures [° C.] | | | RT [ms] To temp. <700° C. | Pressure [bar] Difference | C rate [% by vt.] | | | | | |
|---|---|---|---|---|---|---|---|---|---|---|---|---|---|
| Experiment | H2 [l (STP)/h] | Sicl4 [mL/h] | Furnace | Furnace monitor | Pyrameter | | | 1 | 2 | 3 | 4 | 5 | 6 |
| 1 | 264 | 676 | 1500 | 1500 | 1494 | 4.3 | 3.9 | 25.3 | 25.8 | 25.6 | 25.8 | | |
| 2 | 264 | 676 | 1400 | 1392 | 1391 | 3.1 | 3.6 | 25.6 | 25.1 | 24.8 | | | |
| 3 | 264 | 676 | 1200 | 1185 | 1204 | 2.8 | 3.1 | 23.6 | 23.6 | 23.2 | 23.2 | 23.1 | 23.5 |
| 4 | 264 | 676 | 1100 | 1073 | 1127 | 2.5 | 2.9 | 17.9 | 17.9 | 17.9 | 18.0 | 16.1 | |
| 5 | 264 | 676 | 1000 | 971 | 1035 | 2.3 | 2.7 | 2.5 | 2.7 | 3.3 | 3.7 | 4.7 | 4.9 |

What is claimed is:

1. A process for converting silicon tetrachloride (STC) to trichlorosilane (TCS), said process comprising introducing reactant gas comprising STC and hydrogen into a reaction zone of a reactor in which a temperature is 1100-1600° C., wherein: (a) the reaction zone is heated by a heater located outside the reaction zone and a product gas comprising TCS which forms is then cooled, with the proviso that the product cooled in each case to 700° C. within 0.1-10 ms in the case of a gauge pressure of 0.1 bar at the reactor outlet, within 0.1-20 ms in the case of a gauge pressure of 5 bar at the reactor outlet, and within 0.1-35 ms in the case of a gauge pressure of 10 bar at the reactor outlet.

12. The process as claimed in claim 11, in which the single component formed from the reactor and the heat exchanger comprises channels, wherein only product gas or only reactant gas flows through some of the channels, wherein channel depth and a number of channels vary with a length of the single component, wherein channels are present in which a hydraulic diameter of the channels is 0.05-1 mm.

13. The process as claimed in claim 12, wherein a length of the single component is not more than 1500 mm.

14. The process as claimed in claim 13, wherein the heat exchanger has a ratio of exchange area to gas volume of >500 m$^{-1}$.

15. The process as claimed in claim 14, wherein the reactor is operated at a gauge pressure of the product gas at a reactor outlet of 0-10 bar.

16. The process as claimed in claim 15, wherein a plurality of single gas-tight components each formed by the reactor and the heat exchanger are connected to one another, with provision of common passages for reactant and product gas.

17. The process as claimed in claim 1, wherein there are no seals between the heat exchanger and reactor.

18. The process as claimed in claim 1, wherein the temperature in the reaction zone is 1200-1600° C.

* * * * *